United States Patent [19]
Manmoto et al.

[11] Patent Number: 5,401,210
[45] Date of Patent: Mar. 28, 1995

[54] METHOD OF AND APPARATUS FOR DEBONING MEAT

[75] Inventors: Shinzou Manmoto, Funahashi; Yasutaka Iwasaki, Tokyo, both of Japan

[73] Assignee: Mayekawa Mfg. Co., Ltd., Tokyo, Japan

[21] Appl. No.: 99,345

[22] Filed: Jul. 30, 1993

[30] Foreign Application Priority Data

Jul. 30, 1992 [JP] Japan .................................. 4-203528

[51] Int. Cl.⁶ ............................................ A22C 17/04
[52] U.S. Cl. ...................................... 452/136; 452/127
[58] Field of Search ................. 452/136, 135, 138, 127

[56] References Cited

U.S. PATENT DOCUMENTS

| | | | |
|---|---|---|---|
| 4,216,565 | 8/1980 | Volk et al. | 452/136 |
| 4,380,849 | 4/1983 | Adkinson et al. | 452/136 |
| 4,639,974 | 2/1987 | Olson | 452/136 |
| 4,669,150 | 6/1987 | Manmoto et al. | 452/136 |
| 4,811,456 | 3/1989 | Heuvel | 452/136 |
| 4,893,378 | 1/1990 | Hazenbroek et al. | 452/136 |
| 4,993,113 | 2/1991 | Hazenbroek | 452/136 |
| 5,267,891 | 12/1993 | Cresson et al. | 452/136 |

Primary Examiner—Willis Little
Attorney, Agent, or Firm—Evenson, McKeown, Edwards & Lenahan

[57] ABSTRACT

In a preliminary dissection operation, a meat-carrying thigh bone is obtained by cutting the metatarsal bone at an intermediate position. The meat-carrying bone is then processed to remove the bone from the meat by grasping the ankle end of the tibia bone in the claim of a pulling mechanism; forming a substantially C-shaped cut reaching the bone circumferentially around the tibia adjacent the ankle end; forming a longitudinal cut in the meat along the bone before or after the bone is grasped in the clamp; stripping the meat off the tibia from the ankle to the knee joint by pulling the bone through the opening of a stripper mechanism, exposing the tibia side tendon near the knee joint; cutting the exposed tibia side tendon; stripping meat from the knee joint, exposing the femur side tendon adjacent the joint; cutting the femur side tendon; and then stripping the rest of the meat off the femur by pulling the femur through the stripper opening. Meat and bone thus can be separated accurately without intrusion of a cutter or the like in the bone.

12 Claims, 11 Drawing Sheets

METHOD OF AND APPARATUS FOR DEBONING MEAT

BACKGROUND OF THE INVENTION

1. Field of the Invention

This invention relates to a method of and apparatus for removing meat from the bone of edible animals, especially edible avian animals, and more particularly, to a method of and an apparatus suitable for removing meat from the thigh bone.

2. Description of the Prior Art

Heretofore, the breeding, slaughtering and carcass processing of edible avian animals have been done with equipment which has become extremely large in scale, and various operations have become automated. However, the operation of removing tight means from bones separated from the carcass is still mostly carried out manually, thereby requiring a great deal of man-hours.

Further, in the operation of removing thigh meat from a bone obtained from a domestic fowl leg by cutting the bone off at the femoral joint and cutting off an end portion of the spur, a skilled operator can process an average of 720 thighs (i.e., 360 fowls) per day. In addition, since the operation is carried out by touching the edible meat with the hands, a high overhead cost is required with regard to maintaining edible meat sanitation.

To obviate such drawbacks, a proposed method of automatically removing thigh meat from the bone is disclosed in Dutch Patent Application No. 8,700,213. Briefly, this method uses a film member, which is made of polyurethane or similar tenacious elastic material and has a circular opening with a diameter slightly smaller than the average diameter of the bone of a fowl leg. On the back side of the circular opening a receiving section is provided to receive meat with bone. Meat with bone is pushed from the back side of the receiving section with a piston, while the bone part is pulled out from the circular opening. The pulled-out bone part is clamped with a clamp, and the work is pushed with the piston and pulled-out with the clamp concurrently to remove the bone.

In this method, however, during the bone removal the meat is crushed, and it is impossible to obtain meat having a neat shape.

One of the reasons for this is the pushing of the work with the piston. As the meat is pushed by the piston, it is squeezed as it is stripped off.

A second reason is that since the bone workpiece is passed directly through the stripper comprising the elastic film member, smooth bone removal can not be achieved if the meat is strongly attached to the bone. Particularly, the leg muscle of a fowl is attached to the bone via the tendons at the end of the upper and lower thigh side on the opposite side of the knee joint, and therefore the meat connected to the tendons is pulled apart during the bone removal, resulting in residual meat remaining on the bone without being stripped off.

Further, since the stripper is a film member, it deteriorates rapidly with continued use.

To obviate the above drawbacks, the applicant has proposed a method, in which a belt-like cutter wound on one end of the meat-carrying bone is brought into between the meat and bone in order to remove the meat from the bone, as disclosed in Published Japanese Patent Application No. S59-21337.

With this method, however, the belt can not be moved along the bone surface but enters the bone, or it can not satisfactorily clear the ligament in the joint, but intrudes into the ligament or the cartilage.

Techniques for preventing the intrusion noted above by using a belt-like cutter having an outwardly arcuate sectional profile. This structure, however, results in residual meat remaining on the bone without being stripped off.

In either of the above cases, with the method of bone removal with the sole belt cutter it is difficult to obtain smooth bone removal and it also takes a long time to complete the bone removal because of the presence of the tendons in the vicinity of the joint.

SUMMARY OF THE INVENTION

In view of the above technical problems, it is an object of the invention to provide a method of and an apparatus for bone removal, which enable removal of meat from bones of edible avian animals and also from bones of edible animals such as cattle and swine, particularly the thigh meat, to be done automatically and in a short period of time.

Another object of the invention is to provide a method of and an apparatus for bone removal, which permits accurate and satisfactory separation of the meat from the bone without leaving residual meat on the bone and also without any possibility of a cutter of the like intruding into the bone.

A further object of the invention is to provide a method of and an apparatus for bone removal, which permits meat to be striped off in a neat shape without being crushed or deformed.

With the structure using the belt-like cutter as in Published Japanese Patent Application No. S59-21337, smooth bone removal is difficult due to the presence of the tendons on the side to be processed.

Also, as shown in the Dutch Patent Application No. 8,700,213, with the bone stripper comprising a thin laminar elastic member made of polyurethane or the like, sufficient stripping of meat can not be obtained. In addition, the stripper can not be used for a long period of time because of the deterioration of the elastic member.

If a structure in which the bone part of a meat-carrying bone is pulled out through a hole of a die-like tool is used to strip the edible meat off the bone, the die-like tool hole lacks flexibility. Further, the bone has an indefinite shape, and its sectional profile varies irregularly depending on the position of its section. Therefore, it is impossible to carry out the bone removal operation with a tool having a fixed hole shape like the pull-out die noted above.

To preclude the above drawback, inherent in the prior art, it is a first feature of the invention that use is made of a stripper mechanism, in which, while a stripper with a circular or similar substantially closed opening is used for bone removal is in the prior art, the opening used for stripping the meat off the bone is defined by a plurality of stripper members, one of which is movable in a direction of increasing the area of the opening and is biased resiliently toward the center of the opening.

However, with the above stripper mechanism alone, the object of the invention can not be attained smoothly.

A method according to the invention of removing meat from a thigh bone 65 as shown in FIG. 14, will now be described with reference to FIG. 13.

In a preliminary treatment, i.e., in an operation of dissection, the meat-carrying thigh bone 65 is removed from the fowl, and this thigh meat-carrying bone is cut at a position corresponding to an intermediate position of the metatarsal bone.

The method features the following steps (a) to (d).

(a) The area of the joint 61 of the tibia 6 to the metatarsal bone 60 is clamped with a clamp 13 (27) of a pull-out mechanism to be described later, and a C-shaped or substantially ring-like cut 21 is formed in the vicinity of the joint 61 of the tibia 6 on the side of the ankle such that it extends to the bone.

In this case, before or after clamping the meat-carrying with bone with the clamp 13 (27), a longitudinal cut is suitably formed, if necessary, in the meat along the tibia 6.

(b) After the bone in the area of the ankle side joint 61 of the tibia 6 has been clamped as noted above with the clamp 13 (27) of the pull-out mechanism, the meat 5 on the tibia 6 is pulled apart or stripped off the tibia 6 from the ankle side of the bone by utilizing an opening 11 (26) of the stripper mechanism noted above, thus exposing the tibia tendon 22 in the vicinity of the knee joint 7.

(c) After the exposed tendon 22 has been cut apart, the meat in the area of the knee joint 7 is continually stripped off to expose the tendon 23 of the knee joint 7 on the side of the thigh bone 10.

(d) The exposed tendon 23 is cut apart, and then the femoral meat is continually stripped off to the end by utilizing the opening 11 (26) of the stripper mechanism noted above.

In this case, the meat in the area of the knee joint 7 may be stripped off by using the belt cutter mechanism noted before instead of the stripper mechanism according to the invention.

The step of cutting the meat along the tibia 6 is not essential but is advantageous in order to obtain neat meat through the bone removal.

As equipment necessary for carrying out such bone removal as described above, the inventor proposed a bone removal apparatus is proposed which comprises the above stripper mechanism, a bone pull-out mechanism for pulling out a bone with an end thereof held clamped through the opening of the stripper mechanism, and a Cutter mechanism for cutting the exposed tendon while continuing the stripping of the meat from the bone by the pull-out mechanism.

Unlike the prior art, the meat is not stripped by piston extrusion, but the end of bone projecting from the opening is pulled with the bone pull-out mechanism. Thus, there is no possibility of crushing of the resultant meat.

The cutter surface of the cutter mechanism is suitably disposed on the pull-out side of the opening along a plane perpendicular to the pull-out direction.

The bone removal method according to the invention is suited for removing the bones of edible avian animals with automatic equipment, and it enables safe and ready bone removal to be carried out without need of any particular skill. Besides, it is possible to obtain a yield comparable to that obtainable by a highly skilled operator in the prior art. Further, the operation can be carried out with higher efficiency than the operation carried out by a highly skilled operator of the prior art.

The bone removal apparatus described above has practical effects in that it enables the above method according to the invention to be readily carried out and makes it possible to reliably obtain the effects of the method. Thus, the apparatus is greatly beneficial for the development of the edible meat processing industry.

The invention will now be described in detail.

FIG. 2 shows the stripper mechanism noted above, which was used for a fundamental experiment. Designated at 1 in FIGS. 2 and 3 is a table, which has an opening 2. Tight wires 4a to 4h made of spring steel are stretched across the opening 2 in such a crossing fashion as to define a polyhedron inscribing an imaginary circle 3 concentric with the opening 2. In this fundamental experiment, the diameter of the imaginary circle 3 was set at 15 mm.

With the stripper mechanism 1 (or meat separator) having the above construction, as the end of a meat-carrying thigh bone was inserted through the imaginary circle 3, the steel wires 4a to 4h were elastically flexed to permit passage of the gone in frictional contact therewith, thus stripping the edible meat off the bone. This manner of operation is shown in FIG. 3.

In this experiment, a meat-carrying bone of a domestic fowl was used as sample. Preliminarily, an end portion of the meat-carrying thigh meat bone ahead of the spur was cut off, a substantially ring-like cut was formed in the ankle, and a longitudinal cut was formed in the thigh. Then, an end portion of the tibia called small thigh bone was inserted through the imaginary circle 3 noted above and pulled in the direction of arrow U in FIG. 3.

FIGS. 4 to 6 are schematic views for explaining the process of the fundamental experiment. As shown in FIG. 4, until the wires reach a thigh meat portion slightly ahead of the knee joint 7, the meat can be comparatively readily stripped off the small thigh bone (i.e., the tibia). However, when the wires reach the vicinity of the small thigh bone, as shown in FIG. 4, the subsequent operation becomes difficult because of the presence of the tendon in the area of the small thigh bone adjacent the joint. Forcibly pulling the work thigh by gripping the small thigh bone (or tibia) could result in breakage of the joint or plucking off of the meat. Even skilled pulling of the work by an experienced operator results in a lot of residual meat 8 as shown in FIG. 5.

Accordingly, the tendon was cut apart by forming a cut near line C2 just behind the knee joint 7 (on the side nearer the stem of the femur) by using a cutter (not shown). By so doing, the bone removal was enabled to proceed comparatively readily. However, result joint meat 9 was left on the bone as shown in FIG. 6. Experimental research was conducted to find some way to reduce the amount of residual joint meat, and it was found that the amount of residual joint meat 9 could be greatly reduced by forming another cut near line $C_1$ (i.e., nearer the spur than the tendon joint as shown in FIG. 5.

Going one step beyond the above fundamental experiment, the inventor conducted the following applied experiment. FIGS. 7(A) and 7(B) are plan views showing a stripper mechanism used in the applied experiment. The stripper mechanism 11 comprises a stationary plate 11a and a movable plate 11b, having respective substantially semi-circular notches $11a_1$ and $11b_1$. As shown in FIG. 7(A), the two plates 11a and 11b can be separated from each other such that the substantially semi-circular notches $11a_1$ and $11b_1$ form a circular opening with a diameter D. The movable plate 11b is biased by a spring 12 toward the stationary plate 11a.

The movable plate 11b can be pushed by the spring 12 to the left in the Figure such that the circular opening with the diameter D noted above is changed to a gap with a width d as shown in FIG. 7(B).

In this applied experiment set-up was intended for processing fowl meat, and D and d were set to be D=34 mm and d=10 mm.

FIG. 8 is a schematic view showing the overall applied experiment set-up. Designated at 13 is a shackle, to which a wire rope 14 for pulling the tibia is coupled. The wire rope 14 is passed around a pulley 15 and pulled by a motor 16. In this applied experiment, the motor 16 had a capacity of 90 W, included a speed reduction gear train with a speed reduction ratio of 1/30, and pulled the wire rope at a speed of 3.6 m/sec.

In this applied experiment:

(a) In a preliminary treatment, a cut was formed longitudinally in the thigh meat, and the ankle was cut off. The cutting was done with a round blade cutter 17 shown in FIG. 8. Either the ankle cut-off or the cut formation may be done first, or both the steps may be done at one time.

(b) As a further preliminary treatment, cartilage (or upper bone as it is commonly referred to) connecting the femur and the meat was cut.

(c) Then, the shackle 13 was fastened to the ankle of the thigh meat.

(d) Then, the thigh meat was placed in the set-up such that the stripper mechanism 11 could wedge in the distal end of ankle. At this time, care should be taken lest the fibula or commonly termed small bone should be caught on the stripper mechanism 11.

(e) The stripping (or bone removal) then was carried out up to the vicinity of knee joint.

(f) Then, at a position slightly ahead of the knee joint (as shown by line C1 in FIG. 5) the tendon was cut with the round blade cutter 17 noted above (first cutting).

(g) The stripping was continued until the knee joint was cleared.

(h) Then, at a position of line C2 shown in FIG. 5, the tendon was cut with the round blade cutter 17 (second cutting).

(i) Then, the thigh meat was again placed at the cut positions in the stripper mechanism and the shackle was pulled up until the meat was completely stripped off.

This applied experiment involves some manual operation, and it is difficult to accurately measure the operation time. However, one cycle takes approximately 20 to 30 seconds, the efficiency of this operation being surely higher than the efficiency of the operation carried out by a skilled operator in the prior art. Besides, the operator is not fatigued. Further, the operation is safe because no sharp hand knife is used. The meat yield was substantially comparable to that in the manual operation by the skilled operator in the prior art.

Furthermore, the meat obtained after the bone removal had a very neat shape.

While the above experiment was conducted with fowl meat, the scope of application of the invention may be extended to all edible avian animals and further to all edible animals. For example, the invention is suitably applicable to removing cow thigh meat from the bone.

DETAILED DESCRIPTION OF THE PREFERRED EMBODIMENTS

Preferred embodiments of the invention will now be described in detail with reference to the drawings. Unless particularly describe, the size, material, shape, relative disposition, etc. of the components in the embodiments are not limiting on the scope of the invention but are mere examples.

Prior to describing the construction of the apparatus according to the invention, the main components used in the apparatus will be described.

Figure 1:
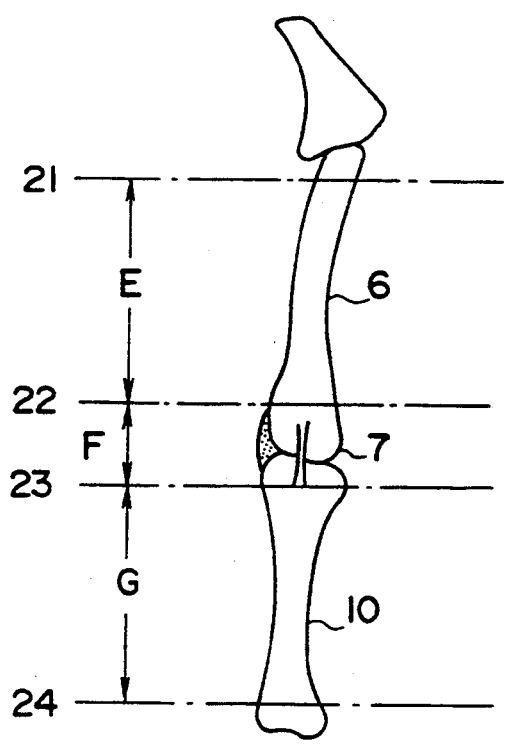
FIG. 1 is a view for explaining an embodiment of the method of bone removal according to the invention.

FIG. 1 shows Example 1 of the method of removing the bone from a meat-carrying fowl thigh bone according to the invention.

To summarize the operation of the method with the lapse of time, the processing spot is moved from the distal end of the meat-carrying thigh bone (i.e., top in the Figure) to the stem of the thigh meat (i.e., the bottom in the Figure). In the stage E from the ankle cutting 21 until the first tendon cut 22 is made (i.e., cutting of tendon on the tibia side), the bone removal operation is done with respect to the tibia 6. In the stage F from the first tendon cut 22 till the second tendon cut 23 is made (i.e., cutting of the tendon on the tibia side), the bone removal is done with respect to the knee joint. In the stage G from the making of the second cut 23 till the completion 24 of bone removal, the bone removal is done with respect to the femur (i.e., upper bone). This embodiment concerns processing of a single femoral leg (including the tip thereof) cut away from the dead edible fowl body, but the invention is similarly applicable to arian animals other than fowls as well as to other edible animals (e.g., cattle and swine). Further, concurrently with or before or after the ankle cutting 21, a longitudinal cut is formed in the thigh meat.

In this operation, the ankle cutter for the edible fowl bone removal conveniently uses a circular cutter as proposed by the inventor in Published Japanese Utility Model Application No. S60-89883, and the longitudinal cut in the thigh meat is conveniently formed by utilizing a cut former as disclosed in Published Japanese Utility Model Application No. 560-89882, in which a cutter head is urged against the surface of a meat-carrying thigh bone along a guide. In this case, if the tendon attached to the fibula is left when forming a substantially ring-like cut (reaching to the bone) around the ankle, it facilitates the subsequent operation, as shown in the publications noted above.

To form a cut which is not perfectly circular but is C shaped by leaving the tendon without being cut, was well known when the present invention wac completed, and thus forming a C shape cut as the substantially ring-like cut belong to the technical scope of the present invention.

Figure 2:
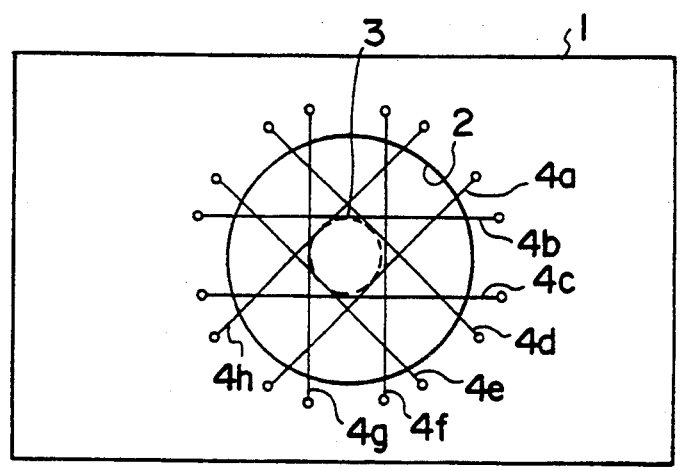
FIG. 2 is a plan view showing a stripper mechanism used for a fundamental experiment for the invention.
Figure 3:
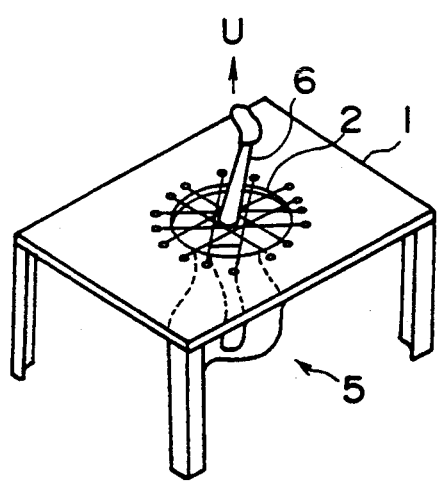
FIG. 3 is a perspective view showing the set-up for the fundamental experiment.
Figure 4:
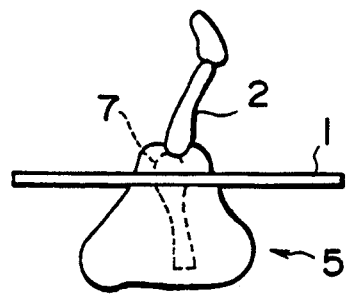
FIG. 4 is a fragmentary side view showing the fundamental experiment set-up.
Figure 5:
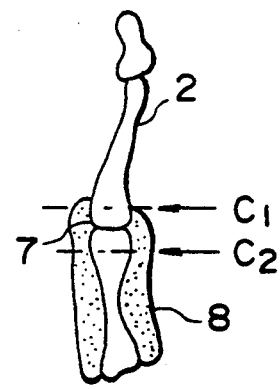
FIG. 5 is a view for explaining a problem in the fundamental experiment.
Figure 6:
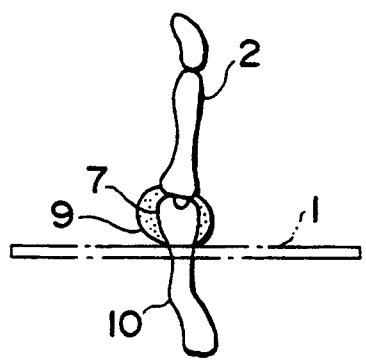
FIG. 6 is a view for explaining another problem in the fundamental experiment.
Figure 7A:
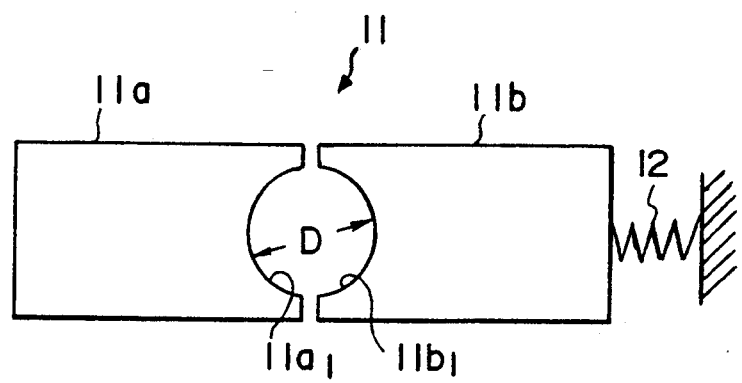
FIGS. 7(A) and 7(B) are plan views showing a stripper mechanism used an in applied experiment pertaining to the bone removal method according to the invention.
Figure 7B:
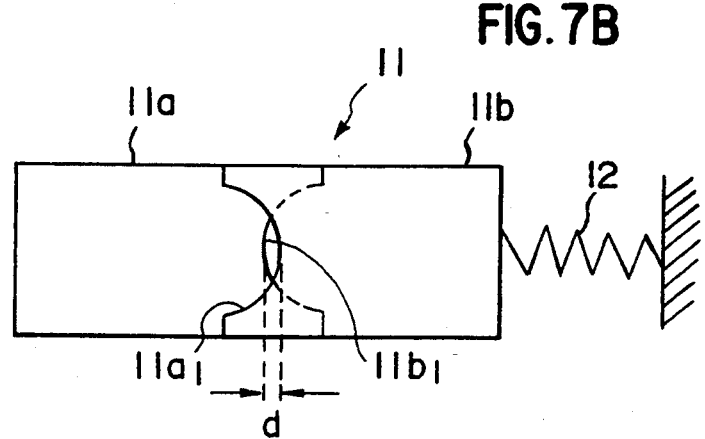
Figure 8:
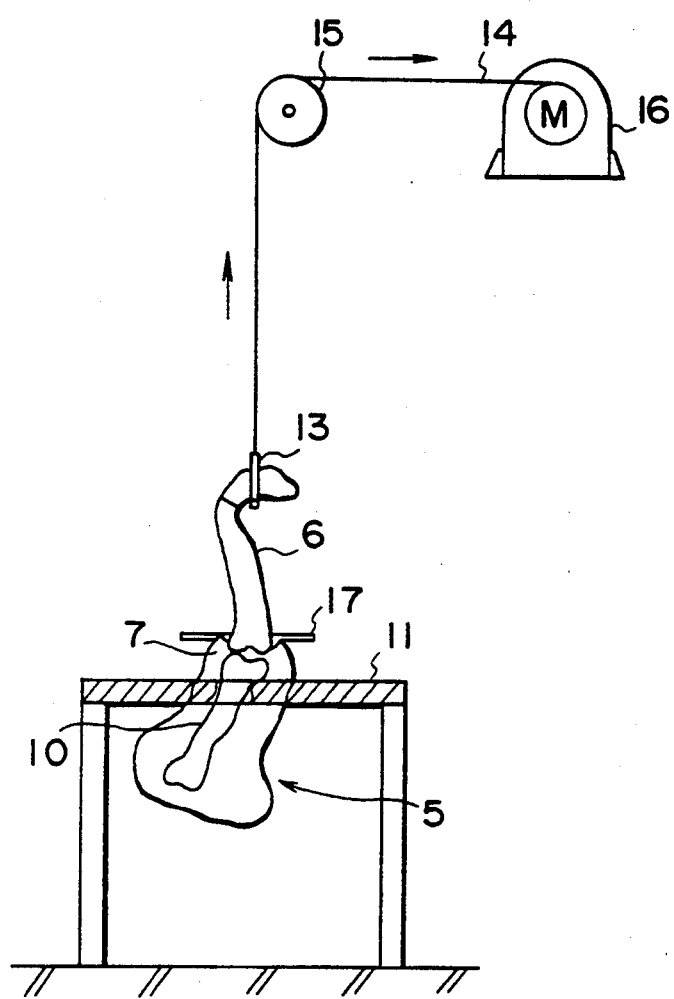
FIG. 8 is a schematic view for explaining the applied experiment.

Using the stripper mechanism 1 shown in FIG. 2 or the stripper mechanism 11 shown in FIGS. 7(A) and 7(B), the bone removal in the stage E is done by inserting bone in the vicinity of the ankle through the variable size opening of the stripper mechanism.

The stripper mechanism 11 shown in FIG. 7 comprises two plates 11a and 11b having respective, substantially semi-circular notches $11a_1$ and $11_1$. The two plates 11a and 11b are disposed such that the notches $11a_1$ and $11b_1$ face each other. The plate 11b is movable in a direction away from plate 11a to increase the area of the opening defined by the notches $11a_1$ and $11b_1$, and it is biased by a spring 12 toward the center of the notches $11a_1$ and $11b_1$. While in this embodiment two plates 11a and 11b are used, it is possible to use three or more plates to form the stripper mechanism.

Subsequently, the tendon of the tibia side exposed by the previous stripping of the meat is cut as shown at 22 (first cutting), and in the stage F the bone removal is continually carried cut up to the second cutting 23, whereby the tendon on the femur side is exposed by the bone removal in the joint portion. The bone removal in the stage F may be carried out by using the prior art belt-like cutter noted above, although it may be done with the stripper mechanism noted above.

The first cutting 22 prior to the bone removal in the stage F is desirably done, in the case of fowl, by forming a cut reaching the bone at a position 5 to 20 mm from the knee joint toward the ankle. In the case of fowl, the second cutting 23 subsequent to the bone removal in the stage F is desirably done by forming a cut in the bone over the entire circumference thereof at a position of 5 to 15 mm from the knee joint toward femur.

In the vicinity of the completion 24 of the bone removal in stage G, the thigh meat is connected to the femur by the cartilage. In the neighborhood of the completion 24 of the bone removal in the stage ~, the thigh meat is coupled to the femur by the cartilage.

The cartilage may be cut in a preliminary treatment or an after-treatment.

Now, a bone removal apparatus for carrying out the bone removal method described above will be described in detail.

Figure 9A:
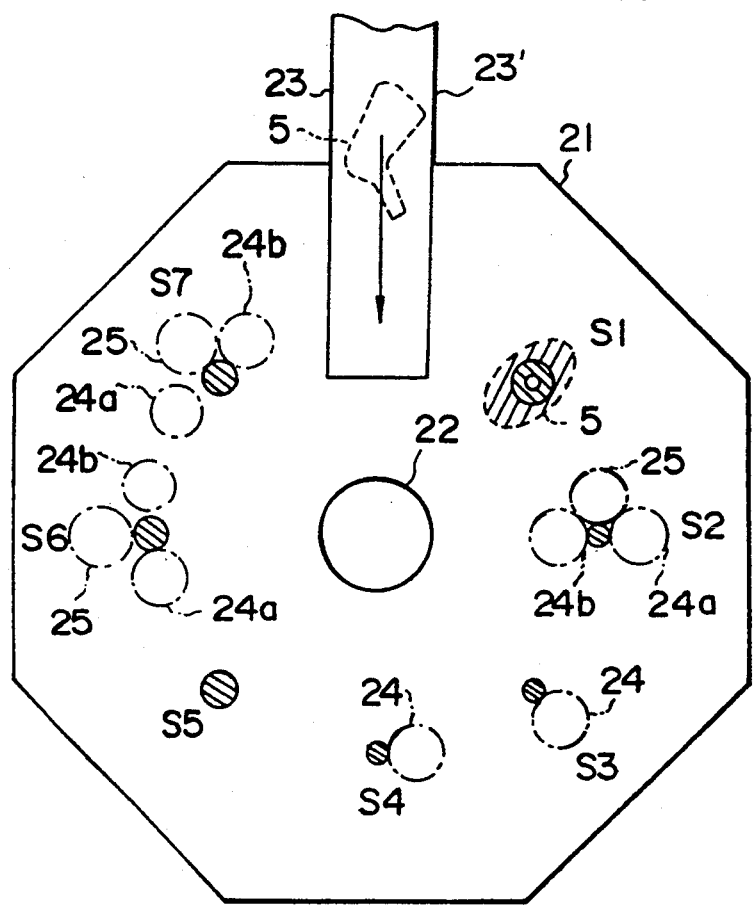
FIGS. 9(A) and 9(B) show a first embodiment of the bone removal apparatus according to the invention with FIG. 9(A) being a plan view, and 9(B) being a side view.
Figure 9B:
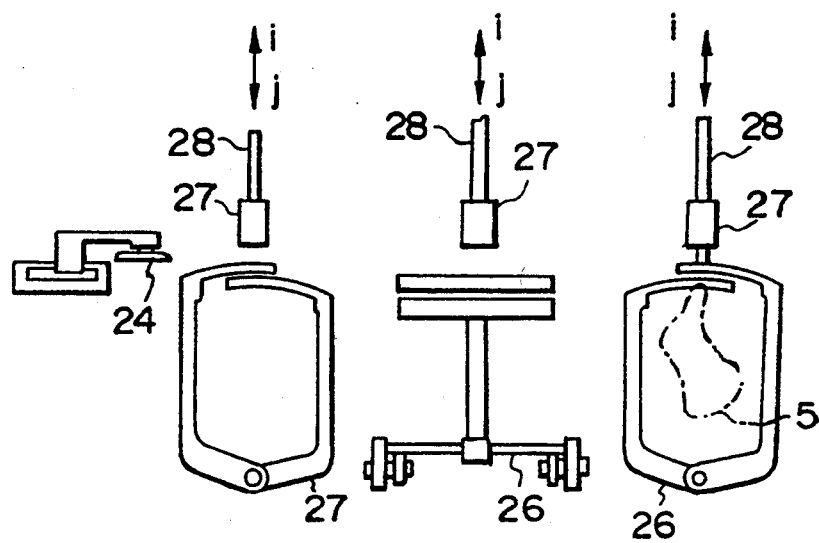

FIGS. 9(A) and 9(B) show an embodiment of the bone removal apparatus according to the invention, with FIG. 9(A) being a schematic plan view, and FIG. 9(B) being a side view. Designated at 21 in FIG. 9(A) is a base table with a center post 22. Stations S1 to S7 are disposed around the center post 22. Designated at 23 is a conveyer for supplying meat-carrying thigh bones 5. Although not shown, a conveyer is also provided for discharging the thigh meat after bone removal. As shown in FIG. 9(B), a chuck 27 is provided for the stations S1 to S7. The chucks 27 each can grip and release the ankle part of the meat-carrying thigh bone 5. In this embodiment, the chuck 27 is well-known semi-automatic chuck mechanism utilizing a toggle mechanism and a spring. It grasps the ankle part of the high meat when the thigh meat is urged against it with the operator's hand, and releases the thigh when a lever is pushed. For carrying out the method according to the invention, the chuck 27 may have a well-known structure. It is supported by a lift rod 28 such that it can be driven vertically up or down as shown by arrow i-j. Also, it can be rotated intermittently about the center post 22 in steps of 360°/8, i.e., 45°.

Whenever it completes a predetermined process operation in each station, it is rotated by 45° to the next processing station.

Each of the stations S1 to S7 has a meat stripper mechanism and/or a cutter mechanism to be described later. However, for carrying out the invention it is possible to provide a station with neither stripper mechanism nor cutter mechanism in order to carry out a different operation.

Figure 10:
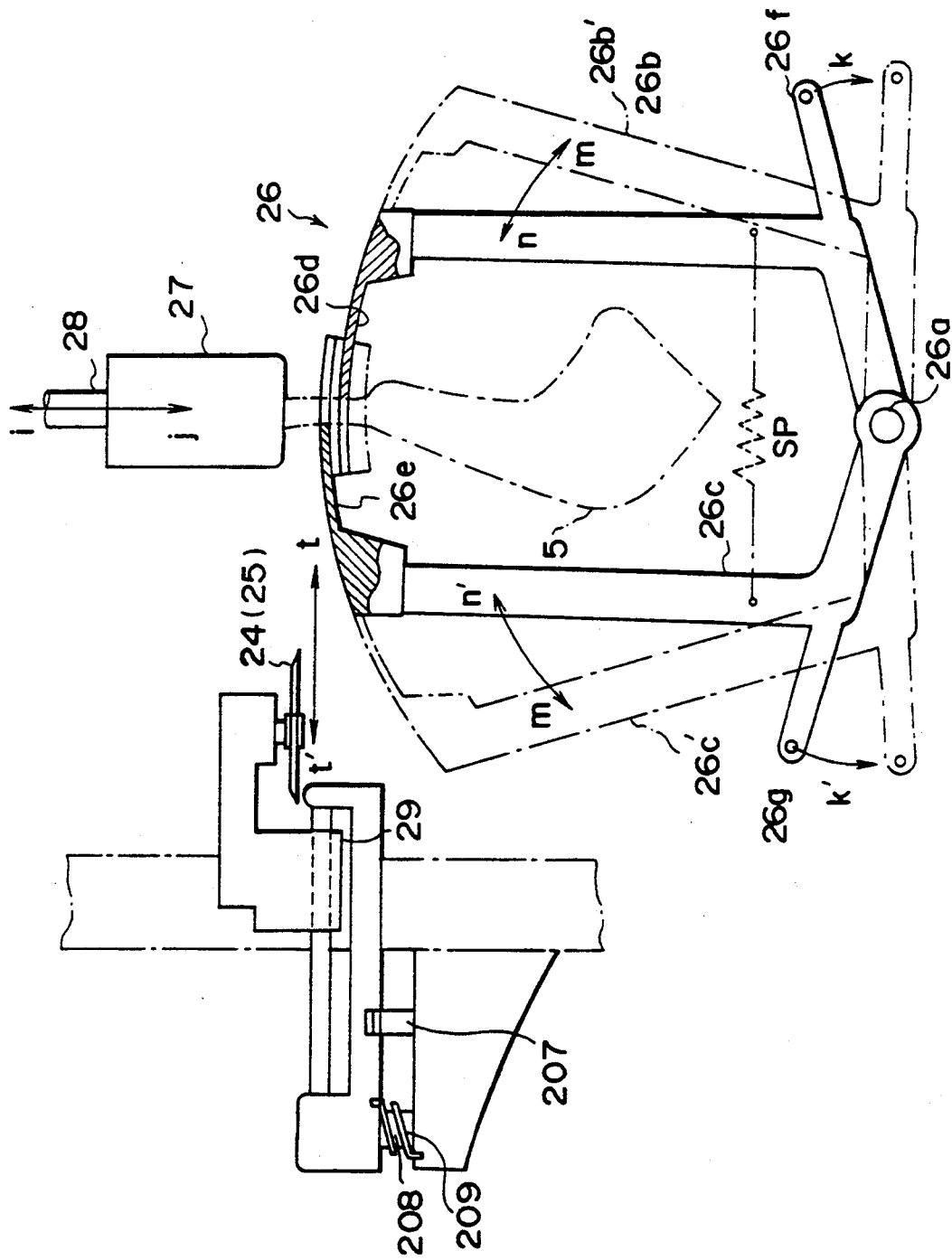
FIG. 10 is a side view, partly broken away, showing the bore removal apparatus of FIG. 9.
Figure 11:
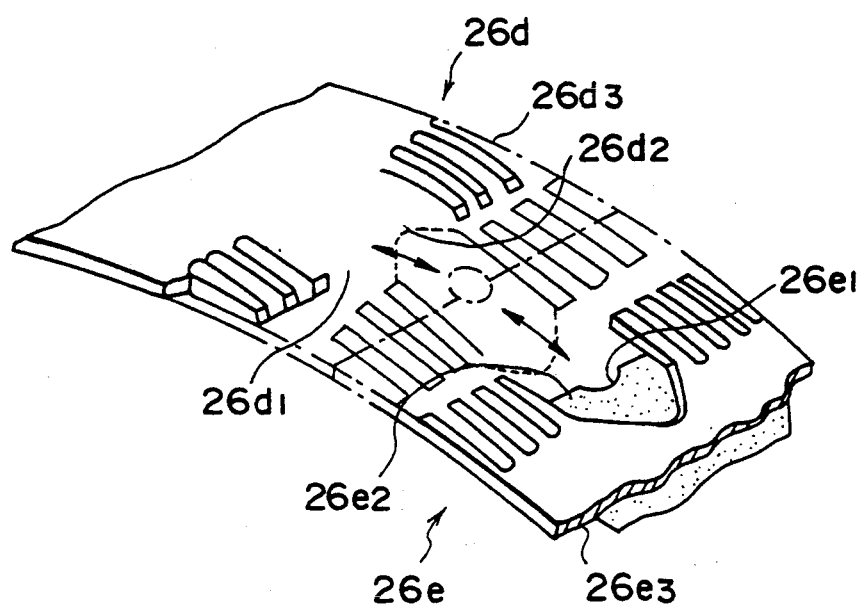
FIG. 11 is a fragmentary perspective view showing the stripper mechanism of FIG. 10.

The stripper mechanism designated at 26 corresponds to the stripper mechanism 11 shown in FIG. 7, and is shown in a detailed enlarged-scale view in FIG. 10 and in a fragmentary perspective view in FIG. 11.

FIG. 10 shows the mechanism schematically to facilitate understanding of the construction and function, and it does not represent the actual shape.

The mechanism has a pivot pin 26a, on which a pair of arms 26b and 26c are pivotally supported. The arms 26b and 26c have respective stripper members 26d and 26e secured to their free ends, and they are biased by a spring SP, as shown by phantom line, toward each other as shown by arrows n and n'. The arms 26b and 26c have respective drive levers 26f and 26g. When forces are applied to these drive levers 26f and 26g in the directions of arrows k and k', the arms 26b and 26c are opened, i.e., tilted away from each other in the directions of arrows m and m' to their phantom line positions as designated by 25b' and 26c'. When the forces applied in the directions of arrows k and k' are removed, the arms are closed to the positions shown by solid lines 26b and 26c, whereby the ankle of the meat-carrying thigh bone 5 is clamped between the pair of stripper members 26d and 26e.

FIG. 11 is a fragmentary perspective view showing the pair stripper members 26d and 26e. The members 26d and 26e have elastic members $26d_2$ and $26e_2$ which are made of rubber or resin and which are disposed such that their semicircular notches $26d_1$ and $26e_1$ face each other. The pair elastic members $26d_2$ and $26e_2$ are secured to an supported by reinforcement members $26d_3$ and $26e_3$ having respective central notches facing each other. With this structure the mechanism can conform to the tibia which may have great dimensional fluctuations, and it also can conform to the small diameter tibia and to the large diameter femur. Further, since the reinforcement/support members $26d_3$ and $26e_3$ can be rocked elastically b the spring sp, the bone removal operation can be performed reliably without any possibility of the mechanism being hooked on or cutting into the bone attached to the thigh meat.

Figure 12A:
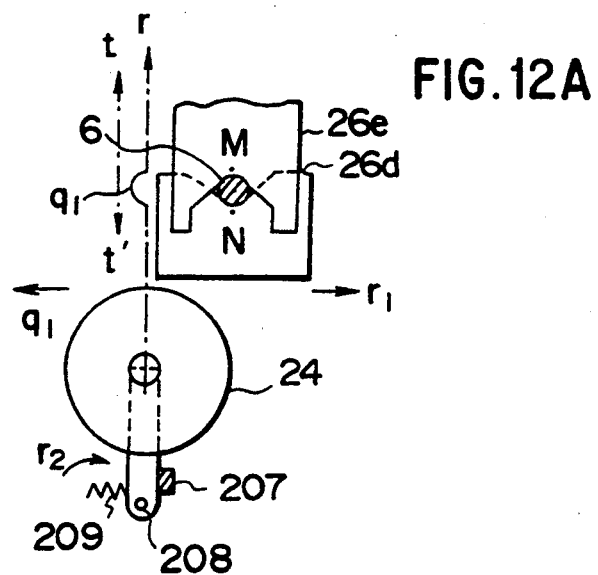
FIGS. 12(A) to 12(C) are schematic plan views for explaining the operation of a cutter in the bone removal apparatus of FIG. 9.
Figure 12B:
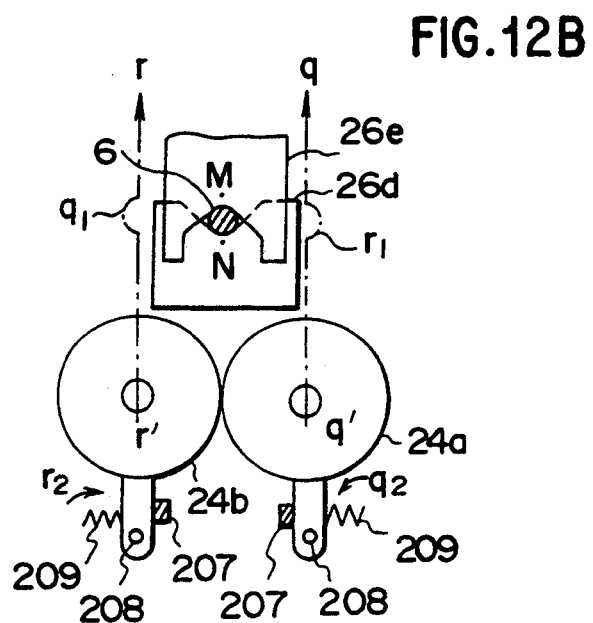
Figure 12C:
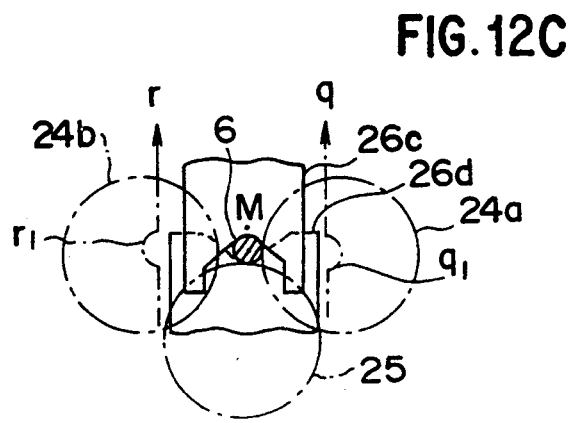
Figure 13:
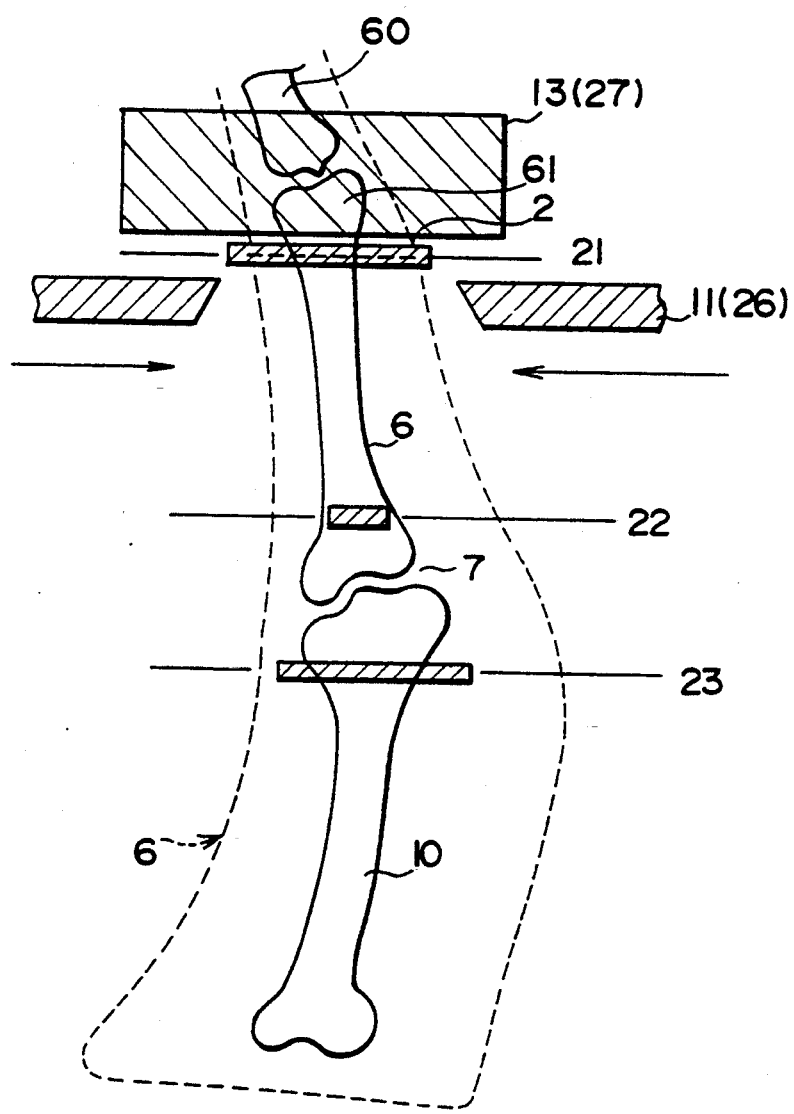
FIG. 13 is a schematic view showing various cutting positions of meat-carrying thigh bone.
Figure 14:
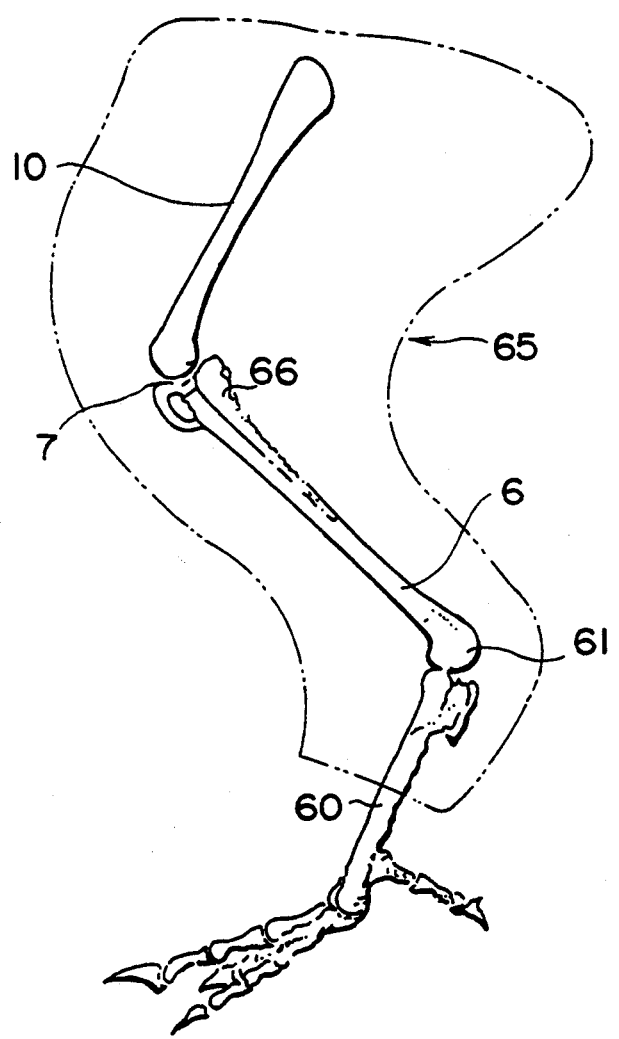
FIG. 14 is a schematic view showing the profile of a meat-carrying thigh bone.

As shown in FIG. 9(A), the station S2 has a pair of cutters 24a and 24b and an independent cutter 25. The stations S3 and S4 each are provided with an independent cutter 24, and the stations S6 and S7 have a pair of cutters 24a and 24b and an independent cutter 25. The cutter 24 is shown in a side view in FIG. 9(B) and in an enlarged-scale view in FIG. 10. As shown in FIG. 9, the cutters 24 (25) each comprise a disk-like rotary blade disposed in a plane substantially at right angles to the ankle of the meat-carrying thigh bone 5 grasped by the chuck 27. They are each driven for rotation by a cutter drive 29 and also reciprocated in a plane substantially at right angles to the ankle (i.e., as shown by reciprocal arrow t—t'). Further, as shown in FIGS. 12(A) to 12(C), a support supporting the cutter drive 29 is biased by a spring member 209 in a direction $r_2$ or $q_2$ so that it can be rocked in the direction $r_2$ or $Q_2$. Thus, the rotary blades 24 and 25 are each capable of being rocked from the position determined by a stopper 207 as shown by the solid lines in direction $r_1$ or $Q_1$ along the circumference of the bone against the biasing force of spring 209. The cutting orbits of the rotary blades 24 (24a, 24b) and 25 of the cutters will now be described with reference to FIG. 12.

First, in the case of FIG. 12(A), the ankle of a meat-carrying thigh bone is clamped between the pair stripper members 26d and 26e. In this case, the rotary blade 25 of the independent cutter is moved as shown by arrow r, while it can be displaced in direction $r_1$ perpendicular to the direction of arrow r by the force of a spring 209 which provides a biasing force in direction $r_2$. Thus, when the rotary blade 25 advancing in direction r while cutting the muscle meat of the meat-carrying thigh bone (which is not shown) is brought into contact with the bone 6, it traces an escape orbit in direction $q_1$ along the circumference of the bone 6 as shown by $r_1$.

In this way, by merely driving the cutter straight as shown by arrow r, a cut can be formed halfway around the circumference of the bone 6, and in the stations 53 and 54 the exposed tendon can be cut.

FIG. 12(B) shows a case of forming an imperfect but substantially ring-Like cut in the circumference of the bone 6. In this case, again the ankle end of a meat-carrying thigh bone is clamped between the pair of stripper members 26d and 26e. Here a pair of rotary cutter blades 24a and 24b are moved side by side as shown by arrows q and r. These rotary blades 24a and 24b can be displaced about their pins 208 in directions $r_1$ and $q_1$ perpendicular to the directions of arrows q and r.

Thus, when the rotary blades 24a and 24b advance in the directions of arrows q and r while cutting the muscle meat of the thigh meat with bone (which is not shown) and are brought into contact with the bone 6, they trace escape orbits around the circumference of the bone 6 as shown by arrows $q_1$ and $r_1$. In this way, by simply driving the pair of rotary blades 24a and 24b in parallel straight directions indicated by arrows q and r, an imperfect but substantially ring-like cut can be formed in the circumference of the bone 6. Thus, in the stations S2, S6 and S7 a cut can be formed in the exposed tendon or meat. With the structure and function described with reference to FIG. 12(B), the areas of two points M And N around the bone 6 remain without being cut. However, in the case of a meat-carrying fowl thigh bone, for instance, the positions of the muscle and tendon are anatomically known, and the intended cutting function can be obtained by suitably selecting the orientation at which the meat-carrying thigh bone is held (depending on the state of the bone removal means).

FIG. 12(C) shows a modification of the embodiment shown in FIG. 12(B). A pair of rotary blades 24a and 24b shown by phantom lines correspond to those previously described in connection with FIG. 12(B). In the embodiment of FIG. 12(C), a rotary blade 25 is provided separate from the rotary blades 24a and 24b. While the pair cutters 24a and 24b are proceeding in the directions of arrows q and r, the rotary blade 25 is stopped when it is brought into contact with the bone. Thus, a C-shaped (i.e., partly incomplete ring-like) cut can be formed in the circumference of the bone 6 by leaving the area of point M uncut as shown. This function is effective when a C-shaped or substantially ring-like cut is formed in the circumference of the bone while leaving the tendon attached to the fibula of the meat-carrying thigh bone.

In FIG. 9(A) an operator is disposed near the station S1, and a meat-carrying thigh bone 5 supplied from the feed-in conveyer 23 is positioned in station S1, that is, it is grasped in the chuck 27 in the station S1 (see FIG. 9(B)). Then, as the step (B) noted above, while urging the cutter head against the meat surface of the meat-carrying thigh bone along the guide noted above in the station S1, a longitudinal cut is formed with the automatic machine. Alternatively, it is possible to form the cut manually before clamping one end of the bone.

Then, in the station S2 a substantially ring-like cut reaching to the bone is formed in the vicinity of the ankle cartilage joint. This operation is carried out by the combination of the pair rotary blades 24a and 24b and the independent cutter 25 shown in FIG. 12(C). Therefore, the cut is not completely ring-like but is C-shaped, leaving the tendon which leads to the fibula attached to the tibia.

Then, in the station S3 the tendon attached to the fibula is cut with the rotary blades 24a and 24b, previously described in connection with FIG. 12(A).

In the station S3, one end of the bone near the ankle is clamped by the pair of stripper members 26d and 26e having respective, substantially semi-circular notches. Thus, one end of the bone is extended through the opening of the stripper mechanism.

Then, between the stations S3 and S4 the chuck 27 holding the ankle of the meat-carrying thigh bone (see FIG. 9(B)) is raised to pull out the thigh bone from the ankle thereof through the stripper mechanism until the knee joint of the thigh reaches the stripper mechanism, thus stripping the meat off the tibia to expose the tendon.

Then, in the station S5 the position of the central part of the joint of the thigh is detected.

Further, in the station S6 the exposed tendon is cut, and then the meat around the knee joint is stripped off to expose the tendon on the femur side of the joint.

Then, the femur side tendon is cut over the entire circumference of the bone, and then the meat is stripped off the femur, thus completing the bone removal.

After completion of the stripping, the bone and thigh meat are discharged on a discharge conveyor 23' (shown overlapping the supply conveyor 23) or along a chute (not shown).

With the individual stations arranged around a ring as in this embodiment, only a small area is needed for installation of the apparatus, and meat-carrying thigh bones can be readily fed in, processed for bone removal, and discharged as a processed product. In addition, the loading and unloading operations can be conveniently carried out by a single operator.

Further, although not shown, it is possible to arrange the individual stations in a straight line, rather than around a ring. This arrangement is suited for an installation which utilizes a narrow surplus space in a plant layout. In addition, it permits ready maintenance of the apparatus in the individual stations.

The foregoing description and examples have been set forth merely to illustrate the invention and are not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of deboning meat using a stripper mechanism having an opening for stripping meat off a meat-carrying bone comprising first and second bone parts having free ends and a joint therebetween, said opening being defined by a plurality of stripper members, at least one of said stripper members being movable to change the size of said opening and being biased in a direction to decrease the size of said opening, said method comprising the steps of:

forming a C-shaped cut reaching the bone adjacent the free end of the first bone part of said meat-carrying bone;

positioning the bone with the free end of the first bone part extending through the opening of the stripper mechanism, and grasping the free end of the first bone part in a holder of a pulling mechanism;

subsequently stripping the meat off the first bone part from said free end of the meat-carrying bone to a position adjacent the joint by pulling the first bone part through the opening of said stripper mechanism, whereby a first tendon near the joint is exposed;

cutting the exposed first tendon;

stripping meat off the joint by pulling the joint through the opening of said stripper mechanism, whereby a second tendon is exposed at the joint adjacent the second bone part;

cutting the exposed second tendon, and stripping meat off the second bone part by pulling the second bone part through the opening of said stripper mechanism.

2. A method according to claim 1, further comprising forming a cut extending longitudinally along said bone and reaching to said bone prior to stripping the meat off the first bone part.

3. A method according to claim 2, wherein said longitudinal cut is formed simultaneously with said C-shaped cut.

4. A method of deboning meat from a meat-carrying animal leg comprising a tibia part having an ankle end and a joint end connected by a knee joint to a femur part, said method comprising the steps of:

forming a C-shaped cut reaching the bone adjacent the ankle end of said tibia part and a longitudinal cut reaching the bone extending along said animal leg;

grasping the ankle end of said tibia part in a holder of a pulling mechanism and stripping meat off said tibia part by pulling said tibia part through a stripper opening of a stripper mechanism, whereby a tibia side tendon is exposed adjacent said knee joint;

cutting the exposed tibia side tendon adjacent said knee joint;

stripping meat off said knee joint by means of a stripper means, whereby a femur side tendon is exposed adjacent said knee joint;

cutting the exposed femur side tendon adjacent said knee joint; and stripping meat off said femur part by pulling said femur part through the stripper opening of said stripper mechanism.

5. A method according to claim 4, wherein the exposed tibia side tendon is cut by forming a substantially C-shaped cut circumferentially around said tibia part spaced from 5 to 20 mm from the knee joint toward the ankle end of the tibia part, and the exposed femur side tendon is cut by forming a substantially C-shaped cut circumferentially around said femur part spaced from 5 to 12 mm from the knee joint toward said femur part.

6. A method according to claim 5, wherein the exposed tibia side tendon is cut by forming a C-shaped cut leaving a portion of the tendon leading to the fibula attached to the tibia.

7. A method according to claim 4, wherein said stripper means is said stripper mechanism.

8. A method according to claim 4, wherein said stripper means is a belt cutter mechanism.

9. An apparatus deboning meat from a meat-carrying bone, said apparatus comprising:

a stripper mechanism having a stripper opening for stripping meat off a meat-carrying bone, said opening being defined, by a plurality of stripper members, at least one of said stripper members being movable to change the size of said stripper opening and being biased in a direction to decrease the size of the opening;

a pulling mechanism for grasping an end of a bone extended through said stripper opening and pulling said bone in a predetermined pulling direction through said stripper opening; and a cutter mechanism positioned for cutting tendons exposed as said bone is pulled through said stripper opening.

10. An apparatus according to claim 9, wherein each stripper member carries a reinforcing support member having an elastic plate of rubber or resin secured thereto, said stripper opening being defined by opposed, overlapping, substantially semi-circular notches formed in the elastic plates, each of said stripper members being movable toward and away from the other stripper members to increase or decrease the overlap of said notches in order to change the size of the stripper opening, and each of said stripper members being biased by a spring member which urges the stripper member toward the other stripper members.

11. An apparatus according to claim 9, wherein said cutter mechanism comprises a plurality of cutter members, at least one of said cutter members comprising a pair of cutters rotatable in a plane substantially perpendicular to the pulling direction of the pulling mechanism, said pair of cutters being biased toward each other by a force exerted by a biasing member, and said cutter mechanism further comprising means for moving said pair of cutters in a direction perpendicular to the direction of said biasing force and to the pulling direction.

12. An apparatus according to claim 9, wherein said stripper mechanism and said cutter mechanism are in fixed locations and said pulling mechanism is movable away from said stripper mechanism.

* * * * *